United States Patent
Wang et al.

(10) Patent No.: US 10,685,142 B2
(45) Date of Patent: Jun. 16, 2020

(54) EXTERNAL RESOURCE CONTROL OF MOBILE DEVICES

(71) Applicant: Indiana University Research and Technology Corporation, Indianapolis, IN (US)

(72) Inventors: XiaoFeng Wang, Bloomington, IN (US); Kan Yuan, Bloomington, IN (US); Xiaoyong Zhou, Sunnyvale, CA (US); Muhammad Naveed, Urbana, IL (US); Soteris Demetriou, Urbana, IL (US); Carl Gunter, Urbana, IL (US)

(73) Assignees: Indiana University Research and Technology Corporation, Indianapolis, IN (US); The Board of Trustees of the University of Illinois, Urbana, IL (US)

( * ) Notice: Subject to any disclaimer, the term of this patent is extended or adjusted under 35 U.S.C. 154(b) by 249 days.

(21) Appl. No.: 15/547,402

(22) PCT Filed: Feb. 2, 2016

(86) PCT No.: PCT/US2016/016110
§ 371 (c)(1),
(2) Date: Jul. 28, 2017

(87) PCT Pub. No.: WO2016/126668
PCT Pub. Date: Aug. 11, 2016

(65) Prior Publication Data
US 2018/0025180 A1    Jan. 25, 2018

Related U.S. Application Data

(60) Provisional application No. 62/110,812, filed on Feb. 2, 2015.

(51) Int. Cl.
*G06F 21/62*    (2013.01)
*G06F 21/57*    (2013.01)

(52) U.S. Cl.
CPC ............... *G06F 21/6281* (2013.01)

(58) Field of Classification Search
CPC ....... G06F 21/6281; G06F 21/30; G06F 21/00
(Continued)

(56) References Cited

U.S. PATENT DOCUMENTS 7,685,638 B1 * 3/2010 Buches .................. G06F 21/53
726/22
2006/0248083 A1  11/2006 Sack et al.
(Continued)

FOREIGN PATENT DOCUMENTS

WO    WO 2014/084967 A1    6/2014

OTHER PUBLICATIONS

International Preliminary Report on Patentability issued by The International Bureau of WIPO, dated Aug. 8, 2017, for International Application No. PCT/US2016/016110; 10 pages.
(Continued)

*Primary Examiner* — Haresh N Patel
(74) *Attorney, Agent, or Firm* — Faegre Drinker Biddle & Reath LLP

(57) ABSTRACT

The present disclosure provides a security enhanced channel control system useable on a wireless device comprising a policy module including at least one processor and memory, the policy module configured to store, in the memory, one or more security policies and apply a compliance check to a first system layer and a second system layer; and a first policy base stored in the memory of the policy module, the first policy base being associated with a mandatory access control ("MAC") base and defining one more security polices for access to a plurality of channels associated with the first and second system layers. The policy module cooperates with the first policy base to establish one or more access control rules that are applied to at least one of the
(Continued)

plurality of channels to preclude an unauthorized application from accessing at least one of the channels.

13 Claims, 4 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2006/0248599 A1* | 11/2006 | Sack .................... | G06F 21/6227 726/27 |
| 2008/0010233 A1* | 1/2008 | Sack .................... | G06F 21/6227 |
| 2008/0301701 A1* | 12/2008 | Khijniak ................ | G06F 21/57 719/311 |
| 2009/0165081 A1 | 6/2009 | Zhang et al. | |
| 2009/0228951 A1* | 9/2009 | Ramesh .............. | H04L 63/0218 726/1 |
| 2012/0185911 A1* | 7/2012 | Polite ................. | G06F 21/6218 726/1 |
| 2013/0036448 A1* | 2/2013 | Aciicmez ............ | G06F 21/6218 726/1 |
| 2013/0065564 A1 | 3/2013 | Conner et al. | |
| 2013/0139244 A1* | 5/2013 | Blaich ................. | H04L 63/0236 726/11 |
| 2013/0185764 A1 | 7/2013 | Krstic et al. | |
| 2013/0198056 A1 | 8/2013 | Aldrey et al. | |
| 2013/0305358 A1 | 11/2013 | Gathala et al. | |
| 2013/0332985 A1* | 12/2013 | Sastry ..................... | G06F 21/30 726/1 |
| 2014/0075495 A1 | 3/2014 | Paris et al. | |
| 2014/0380313 A1 | 12/2014 | Chen et al. | |
| 2015/0019892 A1 | 1/2015 | Agrawal et al. | |
| 2015/0089575 A1* | 3/2015 | Vepa ................... | H04L 41/0893 726/1 |
| 2015/0170731 A1* | 6/2015 | Gajapathy ............ | G11C 7/1009 365/189.02 |
| 2016/0072842 A1* | 3/2016 | Greenbaum ........ | H04L 63/0254 726/1 |
| 2016/0124782 A1* | 5/2016 | Gruby .................... | G06F 9/546 719/313 |
| 2018/0025180 A1* | 1/2018 | Wang .................. | G06F 21/6281 726/1 |

OTHER PUBLICATIONS

International Search Report and Written Opinion issued by the ISA/US, Commissioner for Patents, dated Apr. 19, 2016, for International Application No. PCT/US2016/016110; 12 pages.

* cited by examiner

EXTERNAL RESOURCE CONTROL OF MOBILE DEVICES

PRIORITY CLAIM

This application is a U.S. National Stage Application of International Patent Application No. PCT/US2016/016110, filed Feb. 2, 2016, which claims the benefit of U.S. Provisional Application No. 62/110,812, entitled "EXTERNAL RESOURCE CONTROL OF MOBILE DEVICES," filed on Feb. 2, 2015, the entire disclosures both of which are expressly incorporated herein by reference.

GOVERNMENTAL SUPPORT

This invention was made with government support under CNS1117106 awarded by the National Science Foundation. The Government has certain rights in the invention.

FIELD OF THE DISCLOSURE

The present disclosure relates generally to electronic data security and more specifically to methods and systems for preventing malicious applications access to security-critical information from external resources.

BACKGROUND OF THE DISCLOSURE

The prosperity of the Android ecosystem brings in a broad spectrum of external resources (accessories, web services, etc.), which vastly enrich Android devices' functionalities. Many individuals use smartphone accessories not only for convenience and entertainment (e.g., Bluetooth earpieces, USB travel chargers, etc.), but for performing important tasks related to domains such as healthcare and fitness (e.g., diabetes self-management), finance (e.g., credit card payments) and even home security. Furthermore, web resources are extensively utilized to support Android applications providing sensitive services like mobile banking, monetary transactions and investment management. The external resources carry private user information (health, finance, etc.) and are responsible for security-critical operations (e.g., home security). However, it is not clear whether they are sufficiently protected by mobile operating systems (OS).

EXTERNAL RESOURCE PROTECTION ON ANDROID. A recent study shows that an unauthorized software application(s) or "app(s)" with BLUETOOTH and BLUETOOTH_ADMIN permissions can acquire unfettered access to Android system's Bluetooth healthcare accessories and download sensitive medical data such as, for example, a patient's blood sugar level or other personal healthcare information. Also, research indicates that network sockets opened by screenshot services are exposed to any applications with the INTERNET permission, allowing them to capture the screen of an Android phone at any given point. This lack of control on the network channel can also have other consequences. For example, given the INTERNET permission, an untrusted game application might be able to directly communicate with a corporate internal server, as an authorized application does. Moreover, popular mobile credit-card payment systems are known to be vulnerable to unauthorized access as well. For example, it is reported that credit-card information transmitted by Square dongle to its mobile application through the Audio jack is not encrypted. The credit card information can be easily accessed or acquired by any application with the AUDIO permission. Although the security vulnerability with Square dongle may be fixed with an AES encryption scheme built into its dongle (which increases the cost of the device), such accessory/app side solutions are rather ad hoc, and have security characteristics which are difficult to control. Additionally, most external resources today are completely unprotected due to reasons such as the desire to make applications easy for users, limited capabilities of accessories, cost constraints, etc.

Indeed, as further described herein, researchers have successfully exploited the popular Jawbone UP wristband (an activity tracker recording a user's sleep, eating habits and other daily activities) through the Audio channel, and downloaded all its data using an unauthorized app. This lack of protection is also ubiquitous in apps receiving sensitive information from online resources through Short Message Service ("SMS") and those connected to external devices using Near-Field Communication ("NFC"). More specifically, an analysis of high-profile online financial services (Bank of America, Chase, PayPal, etc.) and social networks (Facebook, Twitter, etc.) that deliver messages to their customers' devices (which should be received by the system app com.android.sms or the official apps of those services), and popular apps that have the NFC capability, has concluded that they are all vulnerable. Again, unauthorized apps could get the user's messages once they are granted the RECEIVE_SMS or READ_SMS permission, and read from the NFC devices they are not supposed to touch when they possess the NFC permission. Of particular concern here are the short messages from banks, which often contain sensitive information such as a password for two-factor authentication, account balances, etc., and therefore should only be seen by their customers through com.android.sms or other official apps provided by the vendor. In addition, messages from Twitter and Facebook even carry links for resetting account passwords. Such information turns out to be completely unprotected from unauthorized apps. Demos for the attacks are posted on a private website.

Such threats to external resources are both realistic and serious, given the fact that indeed a lot of not-so-trustworthy apps do ask for related permissions (with a good reason for doing so sometimes) and have already been used by hundreds of millions of Android users. Take RECEIVE_SMS as an example. Popular third-party apps like Go Locker (50,000,000 to 100,000,000 installations) use it to receive messages (in this case, displaying the message on the lock screen). As further described below, a study on 13,500 highly-ranked apps (500 top apps from each of the 27 Google Play categories) from Google Play shows that altogether 560 apps require the RECEIVE_SMS or the READ_SMS permission, gleaning totally over 3 billion installations. The problem is that once those apps get the permission, they are also granted the privilege to read any messages, including those from Chase with one's account details, from Facebook with the link for resetting the password and from Life360 with the information about the family members' locations.

Fundamentally, Android is not designed to protect its external resources. Specifically, the Discretionary Access Control (hereinafter "DAC") mechanism Android provides to its user is based upon permissions, which are meant for authorizing access to an Android device's local resources such as camera, SD card, etc. When it comes to external resources, all permissions can do is to merely control individual channels through which the phone talks to external resources, such as Bluetooth, NFC, Internet, SMS and Audio. This access control is too coarse-grained to safeguard external resources of critical importance to the user, as it cannot differentiate those attached to the same channel, not to mention implementation of different access policies to protect them. As a result, whoever gets the permission to the channel (e.g., BLUETOOTH, AUDIO) is always given full access to any resources associated with the channel. Even for the emerging SEAndroid powered kernel, a Mandatory Access Control (hereinafter "MAC") mechanism incorporated into Android to enable manufacturers or organizational administrators to specify and enforce finer-grained security policies, it just covers local resources (e.g., files) and cannot even assign a security tag to an external resource.

SECURITY-ENHANCED CHANNEL CONTROL. Given the ongoing trend of using Android devices to support Internet of Things (IoT) for security-critical applications (e.g., home security), it is important to extend the Android security model to protect its external resources. This needs to be done on both the MAC and DAC layers. On one hand, device manufacturers and organizational administrators should be given the means to dictate the way their accessories and online resources should be accessed by apps: for example, only an official Samsung app is allowed to talk to the Samsung smart watch through Bluetooth. On the other hand, flexibility needs to be granted to ordinary users, who utilize third-party accessories (e.g., activity tracking wristband) and interact with third-party online services to manage their private information. For example, the user may hope to install her favorite apps like Go Locker but wants to ensure that they cannot read her bank's messages. Development of such protection mechanisms needs to be well thought-out, to avoid two separate mechanisms with duplicated functionalities, which complicates both the implementation and operations of the security model.

SUMMARY OF THE DISCLOSURE

In one embodiment of the present disclosure a security enhanced channel control system useable on a wireless device is provided comprising a policy module including at least one processor and memory, the policy module configured to store, in the memory, one or more security policies and apply a compliance check to a first system layer and a second system layer; and a first policy base stored in the memory of the policy module, the first policy base being associated with a mandatory access control ("MAC") base and defining one more security polices for access to a plurality of channels associated with the first and second system layers; wherein the policy module cooperates with the first policy base to establish one or more access control rules that are applied to at least one of the plurality of channels to preclude an unauthorized application from accessing at least one of the channels.

In one aspect of this embodiment, the system further includes a second policy base stored in the memory of the policy module, the second policy base being associated with a discretionary access control ("DAC") base and adaptable to include one or more user defined security policies corresponding to channel access permissions of one or more resource channels. In a variant of this aspect, the policy module cooperates with at least one of the first policy base and the second policy base to establish one or more access control rules that are applied to at least one of the plurality of channels to preclude the unauthorized application from accessing at least one of the channels. In another aspect of this embodiment, the system further includes a policy engine disposed in the policy module, the policy engine being supported by at least one vector cache, wherein the policy engine operates the MAC base and the DAC base and causes the policy module to perform the compliance check.

In a variant of this aspect, the first system layer is a framework layer and the second system layer is a Linux kernel layer, and wherein the plurality of channels include at least one of a message channel, a Bluetooth channel, an audio channel, an internet channel, a Near Field Communication ("NFC") channel, a wireless channel, and an infrared channel. In a variant of this variant, one or more security types represent a resource based upon a resource identity observed from a channel, wherein the resource identity includes a Media Access Control ("MAC") address of a Bluetooth accessory, a serial number of an Near Field Communication ("NFC") device, an Internet Protocol ("IP") address of a socket, and a message ID of an Short Message Service ("SMS") sender. In a variant of this variant, the system further includes an enforcement module communicably coupled to the policy module, the enforcement module including one or more security hooks and at least one mapping table, wherein the security hooks are disposed within system functions responsible for operations on one or more channels over the first system layer and a second system layer.

In a variant of this variant, the security hooks identify a security context of an application and a resource identity from a channel by querying the at least one mapping table and wherein the identified security context is used to query at least one of the policy engine and the vector cache to determine, based on the query, whether an application can access the channel. In yet another aspect of this embodiment, the system detects a coupling of an external resource to the wireless device and, in response to detecting the coupling, associates the external resource to at least one of a security context and one or more applications assigned to a domain, and wherein the system instructs a user to select at least one application that is allowed to access the external resource.

In another embodiment of the present disclosure a security enhanced channel control system is provided comprising a policy module including at least one processor and memory, the policy module configured to store, in the memory, a first policy base for a mandatory access control ("MAC") base and a second policy base for a discretionary access control ("DAC") base; a policy engine disposed in the policy module, the policy engine being supported by a first vector cache of a first system layer and a second vector cache of a second system layer, wherein the policy engine operates the MAC base and the DAC base and causes the policy module to perform a compliance check at least in response to a channel access request from an application; and an enforcement module communicably coupled to the policy module, the enforcement module including one or more security hooks and at least one mapping table, wherein the enforcement module queries at least one of the mapping table, the first vector cache, the second vector cache, and the policy engine to determine whether the application can be given access to one or more communication channels of a wireless device.

In one aspect of this embodiment, the first policy base contains a security context for at least one communication channel associated with the MAC base and the second policy base contains a security context for at least one communication channel associated with the DAC base. In a variant of this aspect, the policy module cooperates with at least one of the first policy base and the second policy base to establish one or more access control rules that are applied to at least one of the communication channels to preclude an unauthorized application from accessing at least one of the channels. In another variant of this aspect, the one or more security hooks sanitize a cursor returned to the application based on at least one of a security context and a message address, and wherein sanitizing includes removing a message the application does not have permission to read. In yet another variant of this aspect, wherein the one or more security hooks monitor an audio communication channel and identify an audio device type in response to an audio device connecting to an audio jack of the wireless device.

In a variant of this variant, the one or more security hooks identify a security policy that controls access to the audio device and causes a channel control function of the wireless device to assign an object type in the security policy to the audio channel, wherein assignment of the object type precludes use of the audio channel by an unauthorized application. In yet another variant of this aspect, the system further includes a message content provider accessible by the policy module and adapted to perform a compliance check in response to an application attempting to read message content residing within a message content provider database. In another aspect of this embodiment, the system detects a coupling of an external resource to the wireless device and, in response to detecting the coupling, associates the external resource to at least one of a security context and one or more applications assigned to a domain, and wherein the system instructs a user to select at least one application that is allowed to access the external resource.

In yet another embodiment of the present disclosure a method for controlling access to one or more communication channels of a wireless device is provided comprising establishing, by a policy module, a first policy base containing a security context for at least one communication channel associated with a mandatory access control ("MAC") base; establishing, by the policy module, a second policy base containing a security context for at least one communication channel associated with a discretionary access control ("DAC") base; defining one more security polices for access to one or more communication channels associated with at least one of a first system layer and a second system layer based on the first policy base and the second policy base; performing a compliance check at least in response to a communication channel access request from an application, the compliance check being applied to at least one of the MAC base, the DAC base, and the first and second system layers; and in response to performing the compliance check, querying, by an enforcement module, at least one of a mapping table and a policy engine to determine whether the application can be given access to the one or more communication channels of the wireless computing device.

In one aspect of this embodiment, the policy engine is supported by a first vector cache of the first system layer and a second vector cache of the second system layer, and the policy engine operates the MAC base and the DAC base and causes the policy module to perform the compliance check. In another aspect of this embodiment, the method further includes, establishing, by a user of the wireless computing device, one or more user defined security policies associated with the DAC base, the user defined security policies indicating the one or more communication channels the application is permitted to access. In yet another aspect of this embodiment, the second policy base associated with the DAC base is adaptable to include one or more user defined security policies corresponding to channel access permissions of one or more resource channels.

In yet another embodiment of the present disclosure a method for controlling access to external resources of a portable communication device is provided comprising integrating enforcement mechanisms of a Discretionary Access Control ("DAC") and a Mandatory Access Control ("MAC") in the device; specifying policies on at least one external resource; hosting a DAC policy base; and managing the policies and the DAC policy base using a policy engine and Access Vector Cache that support policy checks within security hooks associated with different channels.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The features of this disclosure, and the manner of attaining them, will become more apparent and the disclosure itself will be better understood by reference to the following description of embodiments of the disclosure taken in conjunction with the accompanying drawings.

Figure 1:
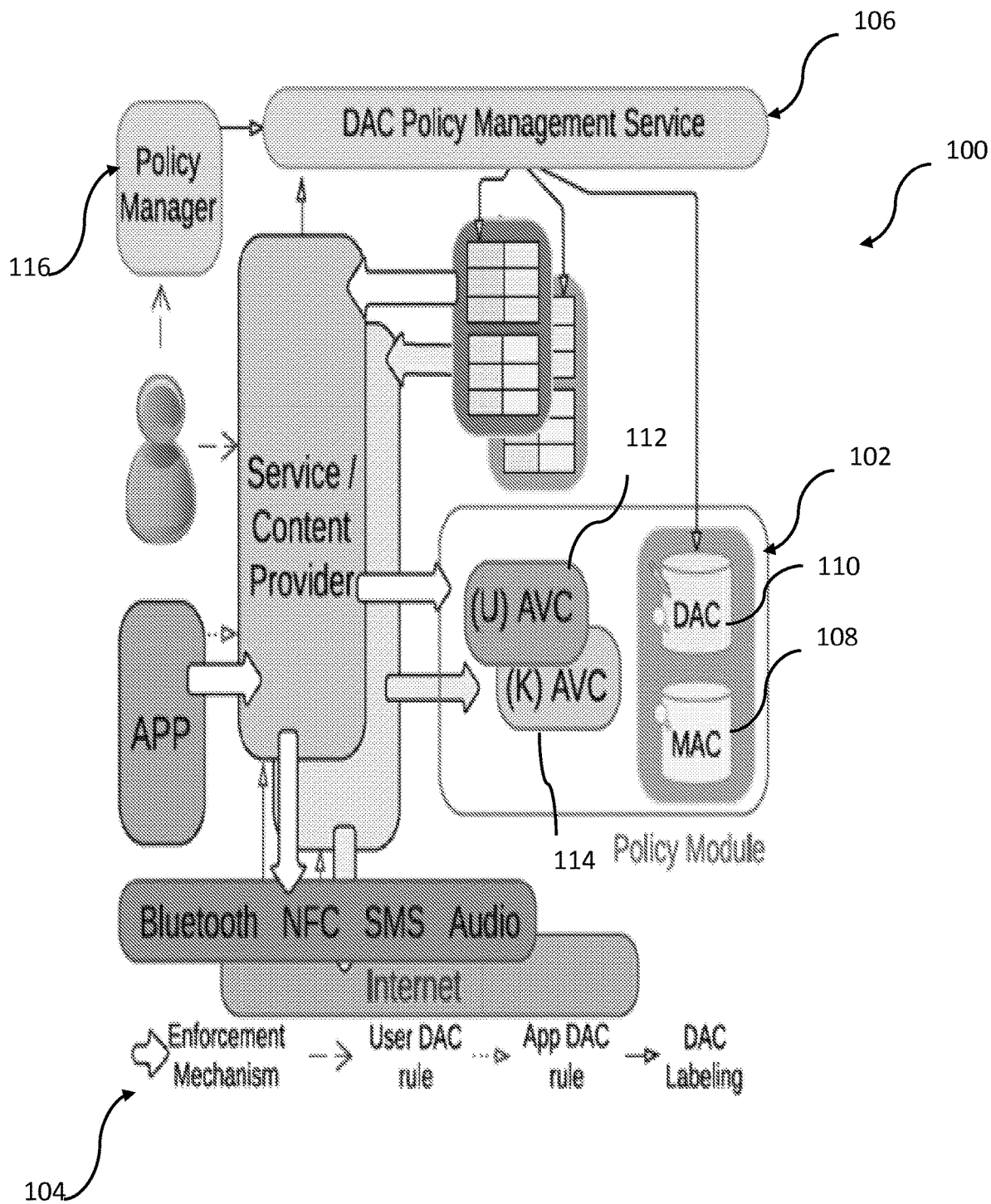
FIG. 1 is a block diagram of an architecture of one embodiment of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION OF THE DISCLOSURE

To address the above-described deficiencies, the present disclosure provides a suite of new techniques that protect Android external resources through mediating the channels they use to interact with the phone. The approach, called Security-Enhanced Android Channel Control (hereinafter "SEACAT"), integrates both MAC and DAC in a way that their policy compliance checks and enforcement go through the same mechanism. This integration simplifies the design of SEACAT and reduces its operational overheads. Additionally, SEACAT is constructed to avoid any interference between these two security models, ensuring that MAC policies are always followed even when DAC has been misconfigured by the user. More specifically, SEACAT implementation on Android devices may be extended on Android Open-Source Project ("AOSP") to describe the external resources over different channels. This is achieved by defining new Security Enhanced Android (hereinafter "SEAndroid") types to represent the resources based upon their identities observed from their channels, including the Media Access Control (MAC) address of the Bluetooth accessory, the serial number of an NFC device, the IP address of a socket and the ID of an SMS sender. These types allow a system administrator to specify a set of mandatory security policies, which are enforced by the security hooks placed at system functions related to those channels within both Android's framework/library layer and the Linux kernel. Whenever a call is generated, the hook checks its policy compliance through a SEAndroid function, and then determines whether to let the call go through in accordance with the outcome of the check. Such operations are applied to MAC policies first.

For the system calls cleared of the MAC policies (i.e., the calling processes are not touching any resources specified by the policy administrator), the hook further checks their compliance with a set of DAC policies, using the same function. These policies are defined in the same format as their MAC counterparts. They are maintained by a policy management service, through which an Android user and application developers can specify how an external device or an Internet service should be accessed by different applications, when those external resources are not included in any MAC policy. For example, the official app of the Chase bank can specify, within its manifest file, a DAC rule that only itself and the system app (com.android.sms) are allowed to receive text messages from the bank. Once this rule is approved by the phone user, a malicious app running on the phone will no longer be able to read messages from Chase, even when it has either the RECEIVE_SMS or the READ_SMS permission. Furthermore, this hybrid MAC/DAC approach enables SEACAT to protect resources with no apparent identifiers: a user can leverage SEACAT's DAC component to restrict access to a channel that is being used to communicate sensitive information. In one embodiment of the present disclosure, SEACAT is implemented on Android 4.4 with the SEAndroid enhanced kernel 3.4.0 (AOSP 4.4.2 r12). In one example, this embodiment may be been run against all known attacks on different external resources, including new attacks discovered and those reported by prior research. SEACAT easily defeated all attacks, at a very low performance overhead.

As such, the present disclosure provides new understandings for Android device security in that it discloses investigation of a set of channels that have not been systematically studied by prior research, including SMS, Audio and NFC. The present disclosure provides further evidence pertaining to Android's limitations in securing its external resources and highlights the need for finer-grained access control techniques to protect them. Additionally, the disclosure provides new techniques in that it discloses the first mechanism that provides centralized and comprehensive protection of different kinds of Android external resources over their channels. The disclosed approach supports both MAC and DAC in an integrated, highly efficient way, without undermining their security guarantees. These new techniques allow both system administrators and ordinary Android users to specify their policies and safeguard their accessories and other external resources. Moreover, the present disclosure provides an evaluation of the disclosed system against all known threats and also measured its performance. Additionally, the present disclosure successfully addresses known security risks and can be swiftly extended to protect new channels.

ANDROID EXTERNAL RESOURCES AND CHANNELS. Android and other mobile systems are routinely employed by their owners for managing their external resources. Particularly, almost every app running on these mobile systems is supported by a remote service, which interacts with the app through the Internet or the telephone network (using short text messages). Such services are increasingly being utilized to store and process private user information, particularly the data related to online banking, social networking, investment, healthcare, etc. Moreover, the trend of leveraging smartphones to support the Internet of Things brings in a whole new set of external devices, which carry much more sensitive data than conventional accessories (e.g., ear pieces, game stations, etc.). Examples include health and fitness systems (e.g., blood pressure monitors, electrocardiography sensors, glucose meters, etc.), remote vehicle controllers (e.g., Viper SmartStart), home automation and security systems and others. These external devices and Internet resources are connected to smartphones through a variety of channels, which are essentially a set of hardware and software through which an app accesses the external resources. The most popular channels include Bluetooth, NFC, Internet, SMS and Audio.

ANDROID SECURITY MODEL. Android devices typically come with a discretionary access control system characterized by its application sandboxing and permission model. Naturally, all third-party apps are considered untrusted by the system. Each Android app is confined within its own sandbox, which is enforced through the Linux-kernel level protection: every app runs as a separate Linux user whose data and process are isolated from those of other apps. To access the resources outside its sandbox, the app can get permissions from the system if it is signed by the manufacturers or other authorized parties or directly from the device owner when the app is installed. Those permissions enable the app to use sensitive resources such as GPS, camera, etc. This security model has been implemented across different Android layers, including the application-framework/library layer (also called middleware) and the Linux kernel layer. A problem of this security model is its coarse granularity. Specifically, for each channel an app needs to go through to touch external resources, the permission-based DAC is binary: the app is either granted unrestricted use of the channel to communicate with any resources attached to it, or denied the channel in its entirety. This is the root cause for the Bluetooth mis-bonding problem reported in prior research, in which any app with the BLUETOOTH and BLUETOOTH_ADMIN permissions becomes entitled to access sensitive patient data collected by a health-care device.

SECURITY-ENHANCED ANDROID ("SEANDROID"). Security-Enhanced Android is a mandatory access control system built on top of the Android device. It is designed to mediate all interactions of an app with the Linux kernel and other system resources. Furthermore, SEAndroid confines even system daemons to limit the damage they can cause once they are compromised. SEAndroid also provides a centralized policy configuration for system administrators and device manufacturers to specify their policies. More specifically, SEAndroid associates with each subject (e.g., process) and object (e.g., file) a security context represented as a sequence user: role: domain or type [: level] and indexed by a Security Identifier (SID). The most important component here is the type (role is for role-based access and level is for multi-level security). Under a "type" enforcement (TE) architecture, a security policy dictates whether a process running within a domain is allowed to access an object labeled with a certain type. In one embodiment, the following may be a policy specified for all third-party apps: allow untrusted_app shell_data_file:file_r-w_file_perms. This policy states that all the apps associated with the domain untrusted_app are allowed to perform "rwfile_perms" operations on the objects associated with the type shell_data_file which is of class file (Class defines a set of operations that can be performed on all objects associated with a type).

The SEAndroid module currently incorporated into the AOSP (Android Open-Source Project) 4.3 and 4.4 defines five domains within its policy files: platform_app; shared_app; media_app; release_app and untrusted_app. The last one is the domain assigned to all third-party applications installed by the user, in accord with Android's adversary model. These policy files are read-only and compiled into the Android kernel code. They are enforced by security hooks placed at different system functions at the kernel layer. For example, the function open is instrumented to check the compliance of each call with the policies: it gets the type of the file to be opened and the domain of the caller, and then runs avc_has_perm with the SIDs of both the subject and object to find out whether this operation is allowed by the policies. Here avc_has_perm first searches an Access Vector Cache ("AVC") that caches the policies enforced recently and then the whole policy file. In addition to the components built into the kernel, SEAndroid also includes a separate middleware MAC ("MMAC") that works on the application-framework/library layer. The current implementation of MMAC on AOSP is limited to just assigning a security tag (e.g., seinfo) to a newly installed application. As is known by one of ordinary skill, Zygote is a daemon or background process program whose goal is to launch Apps. When Zygote forks a process for an app to be launched, it uses that tag in tandem with a policy file (e.g., seapp_contexts) to decide which SELinux domain should be assigned to it.

The current design of SEAndroid still cannot achieve the granularity for controlling external resources. For example, the current design of SEAndroid does not have types defined for the address of a Bluetooth device, the serial number for an NFC device, the SMS ID and the Audio port, nor does it place security hooks at the channels related to such resources. To control access to the resources, system functions at both the kernel layer and the framework/library layer need to be instrumented. SEAndroid does include a mechanism to mediate a range of IP addresses a process can connect to. However, the policy mechanism is hard-coded within the Linux kernel and its enforcement has not been exposed to Android's DAC. As a result, an ordinary user cannot specify rules to protect her Internet resources. As explained further herein, the present disclosure extends both the MAC and MMAC layers that are currently integrated into AOSP, to protect those channels and further leverages the enforcement mechanism to support a DAC system that guards a wide spectrum of external resources.

UNDERSTANDING THE THREATS. To understand the security threats to Android external resources, the present disclosure includes analysing a set of prominent accessories and online services that utilize popular channels. This analysis echoed the prior studies on Bluetooth and the Internet (local socket connections) channels. Studies have found that security-critical Bluetooth devices are under the threats of information stealing and data injection attacks from an unauthorized app with the BLUETOOTH permission, and all no-root third-party screenshot services can be exploited by a malicious app connecting to them through the Internet channel, which can also be abused to break other security policies, e.g., unauthorized access to enterprise internal servers. SMS, Audio and NFC channels are equally under-protected, exposing private user information like bank account balances, password reset links etc. These vulnerabilities point to the security challenges posed by the widening gap between the coarse-grained Android protection and the current way of using external resources.

METHODOLOGY: APPS AND EXTERNAL RESOURCES. In a study for the present disclosure, the permissions for accessing main channels that apps use to communicate with their external resources, including Audio, NFC, SMS, Bluetooth and Internet were first reviewed. The purpose was to find out how pervasive these permissions are among third party apps and how popular those apps are among Android users (indicating their willingness to grant the permissions to the apps). To this end, 13,500 top-ranking apps collected from Google Play, whose total and average number of installations are presented in Table I, were studied. Some of these apps indeed need the permissions to provide services. An example is GoLocker, which uses the RECEIVE_SMS permission to record and process incoming messages, and notify the user of the event on her lock screen. Others applications appeared to be over-privileged by, for example, asking for permissions that the application never uses. In either scenario, Android users have to grant the apps the permissions the apps request in order to install the app, and many users do, as indicated by billions of installations reported by Google Play.

TABLE I

Environment Study: 13,500 top apps (500 top apps for each of 27 Google Play categories) from Google Play.

| No | Permissions | Total Downloads | Average Downloads | Number of apps |
|---|---|---|---|---|
| 1 | READ_SMS (and not 2) | 1,519,670,000 | 11,965,906 | 127 |
| 2 | RECEIVE_SMS (and not 1) | 641,104,000 | 3,727,349 | 172 |
| 3 | 1 AND 2 | 1,220,503,000 | 4,676,257 | 261 |
| 4 | BLUETOOTH (and not 5) | 1,968,116,000 | 9,283,566 | 212 |
| 5 | BLUETOOTH_ADMIN (and not 4) | 0 | 0 | 0 |
| 6 | 4 AND 5 | 1,215,007,600 | 3,310,647 | 367 |
| 7 | RECORD_AUDIO (and not 8) | 1,960,964,950 | 2,689,938 | 729 |
| 8 | MODIFY_AU-DIO_SETTINGS (and not 7) | 417,355,500 | 1,662,771 | 251 |
| 9 | 7 AND 8 | 3,164,060,000 | 8,218,338 | 385 |
| 10 | NFC | 2,583,934,500 | 14,850,198 | 174 |
| 11 | INTERNET | 20,153,137,630 | 1,694,965 | 11890 | downloads (total and average) and #apps per sensitive

It was further investigated whether the apps using these permissions (particularly for Audio, NFC and SMS) to exchange sensitive data with their external resources do it in a secure manner. If this resourceapp protection is not in place, other apps with the same permissions can access the data, due to Android's coarse-grained control on the channels. For this purpose, a small set of top-ranking apps handling private information were selected, including 13 Audio and 17 NFC apps. For SMS, 14 popular online services were reviewed, including those provided by leading financial institutes (Bank of America, Chase, Wells Fargo, PayPal) and social networks (Facebook, Twitter, WhatsApp, WeChat, NaverLine, etc.), and a web mail (Gmail). Those services communicate with com.android.sms and sometimes, their own apps using short text messages. For the Bluetooth and Internet channels, privacy threats to these channels have already been reported by prior research.

Table II provides examples for the apps and services used in the study. All of the services analyzed clearly involve private user data, so do 6 fitness, credit-card related Audio apps. Most of the apps in the Audio category are remote controllers or sensors that work with a dongle attached to the Android device's Audio jack. Although those devices do not appear to be particularly sensitive (e.g., the camera that can be commanded remotely to take pictures), such functionalities (e.g., remote control) could have security implications when they are applied to control more sensitive devices. The study also revealed that the most prevalent use of NFC apps is for reading and writing NFC tags (tags with microchips for short-range radio communication), which can be used to keep sensitive user data (e.g., a password for connecting to one's Wi-Fi access point) or trigger operations (e.g., Wi-Fi connection). A more sensitive application of NFC is payment through a digital wallet. However, related NFC equipment is difficult to come by.

InboundSmsHandler puts it in an Intent, and then calls SMSDispatcher to broadcast it to all the apps that register with the event (SMS_RECEIVED_ACTION or SMS_DELIVER_ACTION) and have the RECEIVE_SMS permission. Also the InboundSMSHandler stores the message to the content provider of SMS. Such a message is limited to the text content with up to 160 characters. To overcome this constraint, the message delivered today mainly goes through Multimedia Messaging Service (MMS), which supports larger message length and non-text content such as pictures. What really happens when sending such a message (which can include multimedia content) is that a simple text message is first constructed and transmitted through SMS to the MMS on the phone, which provides a URI for downloading the actual message. Then, MMS broadcasts the message through the Intent to recipients with the RECEIVE_MMS

TABLE II

Critical Examples

| Channel | App | Usage | # of downloads | Details |
|---|---|---|---|---|
| AUDIO | EMS+ | Credit card reader | 5,000-10,000 | Decrypt: Creates a private key of RSA with hardcoded modulus and private exponent. Uses it to load session key which is used in AES to process messages from credit card dongle. |
| AUDIO | UP | Tracks sleep, physical activity and nutritional info | 100,000-500,000 | Doesn't include any authentication features. A repackaged app with different credential is able to read existing data from the band. |
| SMS | All bank services | Alert messages and Text banking | NA | Both SMS can be read by any app with SMS permission. Alert messages: sensitive financial activity and amount info. Text banking: receive, send money and check balance. |
| SMS | Chat and SNS | Authentication | 100,000,000-1,000,000,000 | 2 step authentication; verification code sent via SMS. |
| NFC | SquareLess | Credit card reader | 10,000-50,000 | Reads credit card information. Malicious apps may also read credit card data as this app does. |
| NFC | Electronic Pickpocket RFID | Credit card reader | 10,000-50,000 | Reads credit card information. Malicious apps may also read credit card data as this app does. |

METHODOLOGY: SECURITY ANALYSIS. Over those apps and services, both dynamic and static analyses were conducted to determine whether there is any protection in place when they use those channels. For SMS, an app was built with the RECEIVE_SMS permission to find out what it can get. All NFC apps were studied using NFC tags, in the presence of an unauthorized app with the NFC permission. For those in the Audio category, a Jawbone UP wristband, a popular fitness device whose app (com.jawbone.up) has 100,000 to 500,000 downloads on Google Play, was analysed to understand its security weakness. In the absence of other Audio dongles, relevant apps were decompiled for a static code inspection to find out whether there is any authentication and encryption protection during those apps' communication with their external devices. Specifically, we looked for standard or homegrown cryptographic libraries (e.g., javax.crypto, BouncyCastle, SpongyCastle) within the code, which are needed for establishing a secret with the dongles. Also, the apps are expected to process the data collected from their dongles locally, instead of just relaying it to online servers, as a few payment apps do. This forces them to decrypt the data if it has been encrypted. Finally, those apps were run to check whether a password or other secrets are needed to establish a connection with their dongles. The analysis was performed on a Nexus 4 with Android 4.4.

RESULTS: SMS. The SMS channel turns out to be intricate. Whenever the Telephony service on the phone receives a text message from the radio layer, the permission and also saves the message locally through its content provider. An app with the READ_SMS permission can query both the SMS and MMS content providers for their contents. The study showed that this mechanism can leak sensitive information.

As expected, all short messages from leading online services delivered to the Nexus 4 phone were fully exposed to the unauthorized app with the READ_SMS or the RECEIVE_SMS permission. Note that such messages should only be received and read by com.android.sms to display their content to the owner of the phone, as well as those services' official apps such as, for example, Facebook, Naver Line, WeChat and WhatsApp, directly extract a verification code from their servers' messages to complete a two-step authentication on the owner's behalf. Information leaks through this under-regulated channel are serious and in some cases, catastrophic. A malicious app can easily get sensitive information such as account balances, incoming/outgoing wire transfers, debit card transactions, ATM withdrawals, a transaction's history, etc. from Chase, Bank of America and Wells Fargo, authorized amount for a transaction, available credit, etc. from Chase Credit Card and Wells Fargo Visa, and notifications for receiving money and others from PayPal. It can also receive authentication secrets from Facebook, Gmail, WhatsApp, WeChat, Naver Line and KakaoTalk, and even locations of family members from Life360, the most prominent family safety online service. An adversary who controls the app can also readily get into the device owner's Facebook and Twitter accounts. For example, all an adversary would need to do is to generate an account reset request, which will cause those services to send the owner a message with a reset link and confirmation code. With such information, even the app itself can automatically reset the owner's passwords, by simply sending requests through the link using the mobile browser. Note that almost all banks provide mobile banking, which allows enrolled customers to check their account and transaction status through SMS messages. Given the fact that even among our collection of 13,500 apps, already hundreds of third-party apps with the READ_SMS or RECEIVE_SMS permission have been installed billions of times (see Table I), for millions of users, their confidential information (account details, authentication secret, etc.) has already been exposed to those apps.

RESULTS: AUDIO. The Jawbone UP wristband, one of the most popular fitness devices that utilize the low-cost Audio channel, was analyzed. The device tracks its user's daily activities, when the user moves, sleeps and eats, and provides summary information to help the user manage their lifestyle. Such information can be private. However, it is completely unprotected. The study ran an unauthorized app that dumped such data from the device when it was connected to the phone's Audio jack. For all other apps in the Audio category, the study did not have apps hardware pieces and therefore could only analyze the apps code statically. Specifically, among all 5 credit-card reading apps, PayPal, Square and Intuit are all heavily obfuscated, which prevented the study from decompiling them. Those devices are known to have cryptographic protection and designed to send encrypted credit-card information from their card readers directly to the corresponding web services. The other two apps, EMS+ and Payment Jack, were decompiled in the research. The analysis shows that both of them also receive ciphertext from their card-reader dongles. However, they decrypt the data on the phone using a hard-coded secret key. Since all the instances of these apps share the same key, an adversary can easily extract it and use it to decrypt a user's credit-card information downloaded from the app's payment dongle. Furthermore, all other apps, which either support sensors (e.g., wind meter) or remote controllers (e.g., remote picture taking), are unprotected, without authentication and encryption at all. This demonstrates the challenge for the device manufacturer and app developer to come up with a practical resource-device protection mechanism, highlighting the need for an Operating System (OS)-level solution.

RESULTS: NFC. Android employs a dispatcher mechanism to decide which app can access an NFC device or tag. The dispatcher will choose an app to get NFC Date Exchange Format ("NDEF") data and the device/tag's serial number, according to the priorities that the apps register with through Intent-filters. These priorities from the highest to the lowest are: NDEF_DISCOVERED, TECH_DISCOVERED and TAG_DISCOVERED. The system app (com.google.android.tag) runs with the lowest priority. According to its priority, an app receives the Intent that carries NDEF data scanned by the phone. When the NFC device/tag has no NDEF data (but data in other formats) on it, the Intent dispatched to the app just contains the serial number of the device/tag, not the data, and the recipient is supposed to directly communicate with the device/tag using the number to get the data. Also, when multiple apps have the same priority, an "Activity Chooser" dialogue will be presented to the user for selecting the receiving app. This process negatively affects users' experience as every single time that a tag is discovered a pop-up box will appear, even for the tag that has been used before.

According to research, 5 out of 17 popular NFC apps (e.g., NFC Tools) were found to be used to read and write NFC tags (Note: This is expected as this is one of the major use cases of NFC on Android). These apps allow users to store any data on tags, including sensitive information (e.g., a password for one-touch connection to a Wi-Fi access point). However, there is no authentication and encryption protection at all. There are more expensive tags such as MIFARE that support encryption and authentication. The app using those tags needs the user to manually enter a secret. Clearly, they are not used for protecting the information like Wi-Fi passwords, which should be passed to one's device conveniently. An unauthorized app was run with the NFC permission to collect data from the tag whenever the Nexus phone touched it. The "Activity Chooser" mechanism could offer some protection, but only in the case a malicious app does not have a higher registered priority than the legitimate one. This can be a problem, for example, when one only uses the system NFC app, which has the lowest priority. Also the approach cannot be used by system administrators to enforce any mandatory policies. Android is also vulnerable in the case that a malicious app is in the foreground with foregroundDispatch enabled. When this happens, the OS will send the Intent to that app allowing it data access.

Among the rest of the apps, NFC ReTag FREE utilizes the serial number of an NFC tag to trigger operations. Again, since the communication through the NFC channel is unprotected, a malicious app can also acquire the serial number, which leaks out the operation that the legitimate app is about to perform. The only NFC app with protection is the NFC Passport Reader. What it does is to use one's birth date, passport number and expiration date to generate a secret key for encrypting other passport information. The problem is, once those parameters are exposed, the adversary can recover the key to decrypt the data collected from the NFC channel.

DISCUSSION. From the 13,500 apps collected, it is further noted that any app with the Internet permission (for 93% of them, each has been installed 1,694,965 times on average, as shown in Table I) can access any domain. With advertising already a ubiquitous way for apps to profit, more and more apps request the INTERNET permission to allow the ad component to work. This creates privacy risks when such apps are being used in a business or private network, as they can freely connect to any internal servers, if proper protection is not in place. Therefore, users should be able to control access to IP/domains. For example, an organization can require its employees to set policies on their phones to ensure that internal IP addresses are only accessed by its enterprise apps, not Angry Birds. Also, as shown in Table I, nearly 600 third-party apps ask for the BLUETOOTH or BLUETOOTH_ADMIN permissions, and have been installed over 3 billion times. The presence of these apps, which most likely are not fully trusted, constitutes a serious threat to private user data stored on different Bluetooth accessories (e.g., glucose meters), as reported by prior research. Note that so far, there is no effective way to address this issue. Although a framework-layer defense mechanism (called Dabinder) has been proposed, it can actually be bypassed by a malicious app with native code. This is because the protection was implemented within the Bluetooth service as is further discussed below with reference to FIG. 3, while native code with the BLUETOOTH and BLUETOOTH_ADMIN permissions can directly talk to the Bluetooth stack to establish a connection with the external device. In this disclosure, a new technique that provides comprehensive protection and supports Mandatory Access Control on this channel is provided.

EXTERNAL CHANNEL CONTROL. The study presented above emphasizes the need for a more fine-grained control over the channels of communication with Android external resources, with strong security guarantees. Ad-hoc solutions on each channel fall short of providing such guarantees and further suffer from the lack of backwards-compatibility, flexibility, extensibility to future channels and maintainability. In the remainder of this disclosure, a first design for protecting Android's external resources is presented. The present disclosure provides a SEACAT system that employs a flexible hybrid MAC/DAC approach. It extends SEAndroid's MAC to safeguard resources with distinct resource identifiers such as SMS, NFC, Bluetooth and Internet channels, and also adds in a DAC module to allow the user and app developers to specify rules through simple and straightforward user interaction for all these channels. In addition, its DAC component allows control of channels even in the absence of resource identifiers. In one embodiment, the DAC component may be illustrated on the Audio channel. In one embodiment, SEACAT may be implemented on AOSP 4.4 r12 with an SEAndroid-powered kernel 3.4.0.

DESIGN OVERVIEW: CHALLENGES. An objective is to develop a simple security mechanism that supports flexible fine-grained mandatory and discretionary protection of various external resources through controlling their channels of communication. A solution should also be extensible as potential channels, app functionalities and developer practices are hard to predict. Furthermore, the system should be maintainable and easily manageable. Lastly, a solution should be efficient, backwards-compatible and effective. In various embodiments, one or more technical challenges may need to be overcome to provide effective design and implementation.

DESIGN OVERVIEW: LIMITATIONS OF SEANDROID. Today's SEAndroid does not model external resources. Even after it is extended to describe them, new enforcement hooks need to be added to system functions scattered across the framework/library layer and the Linux kernel. For example, the Bluetooth channel on Android 4.4 is better protected on the framework layer, which has more semantic information, while the control on the Internet should still happen within the kernel. Supporting these hooks requires a well thought-out design that organizes them cross-layer under a unified policy engine and management mechanism for both MAC and DAC.

DESIGN OVERVIEW: COMPLEXITY IN INTEGRATION. Current Android devices already have the permission-based DAC and SEAndroid-based MAC. An additional layer of DAC protection for external resources could complicate the system and affect its performance (Note that this new DAC cannot be easily integrated into the permission mechanism, since the objects there (different Bluetooth devices, web services, etc.) can be added into the system during runtime). Integrating SEACAT into the current Android device architecture in the most efficient way is challenging.

DESIGN. Referring initially to FIG. 1, to address the aforementioned challenges, a centralized design as shown in SEACAT system 100 (hereinafter "system 100") is provided that integrates policy compliance checks from both the framework and the kernel layer, and enforces MAC and DAC policies within the same security hooks. System 100 safeguards all known external resources in a unified way allowing its easy extension to new channels. More specifically, the architecture of system 100 includes a policy module 102, a policy enforcement mechanism 104, and a DAC policy management service 106. Policy module 102 stores security policies and provides an efficient compliance-check service to both the framework and the kernel layers. It maintains two policy bases, one for MAC and the other for DAC. System 100 further includes a MAC base 108 which is static and may be compiled into the Linux kernel in the current SEAndroid implementation and a DAC base 110 that can be dynamically updated during the system's runtime. Both of them are operated by a policy engine (not shown) that performs compliance checks. The engine is further supported by two Access Vector Caches ("AVC"), a kernel AVC 112 and a framework layer AVC 114. Each AVC 112 and 114 caches the policies recently enforced using a hash map. Due to the locality of policy queries, this approach can improve the performance of compliance checks. Since DAC policies are in the same format as MAC rules, they are all served by the same AVC and policy engine.

The enforcement mechanism 104 comprises a set of security hooks and two pairs of mapping tables. These hooks are placed within the system functions responsible for the operations on different channels over the framework layer and the kernel layer. Whenever a call is made to such a function, its hook first looks for the security contexts of the caller (i.e., app) and the object (e.g., a Bluetooth address, the Sender ID for a text message, etc.) by searching a MAC mapping table first and then a DAC table. The contexts retrieved thereby, together with the operation being performed, are used to query the AVC and the policy engine. Based upon the outcome, the hook decides whether to let the call go through. Just like the AVC, each mapping table has two copies, one for the framework layer and the other for the kernel. Also, the MAC table is made read-only while the DAC table can be updated during runtime. Both the DAC policy base and DAC mapping table are maintained by the policy management service 106, which provides the user an interface to identify important external resources (from their addresses, IDs, etc.) and the apps allowed to access them. Also it can check manifest files of newly installed apps to extract rules embedded there by the developer (e.g., only the official Chase app can get the text message from Chase) to ask for the user's approval. Those policies and the security contexts of the labeled resources are uploaded to the DAC base and the mapping tables respectively.

ADVERSARY MODEL. Like SEAndroid, the security guarantee of system 100 depends on the integrity of the kernel. It is assumed that the adversary has not compromised the kernel. System 100 can tolerate corrupted system apps, as long as they are confined by SEAndroid. Furthermore, the DAC mechanism is configured by the user and therefore could become vulnerable. However, the present design makes sure that even when it is misconfigured, the adversary still cannot bypass the MAC protection in place. Finally, all third-party apps are regarded as untrusted and thus the presence of malicious apps is assumed on the user's device, with proper permissions to access all aforementioned channels.

POLICY SPECIFICATION AND MANAGEMENT. To control external resources, we first need to specify the appropriate policies and identify the subjects (i.e., apps) and objects (e.g., Bluetooth glucose meter, the Chase bank, etc.) to apply them. This is done within the policy module and the policy management service.

POLICY SPECIFICATION. As discussed earlier, an SEAndroid rule determines which domain is allowed to access which resources, and how this access should happen.

To specify such a rule for external resources, both relevant domains (for apps) and types (for external resources) need to be defined. The domain part has already been taken care of by SEAndroid: we can directly declare ones for any new apps whose access rights, with regard to external resources, need to be clarified. When it comes to types, those within the AOSP Android have been marked as file_type, node_type (for sockets and further used to specify IP range), dev_type, etc. In the present disclosure, new categories of types (or attributes) are further specified, including BT_type for MAC addresses of Bluetooth devices, NFC_type for NFC serial numbers and SMS_type for SMS Sender ID (originating addresses). Here is an example policy based upon these domains and types: allow trusted_app bt_dev:btacc rwperms where bt_dev is a type for Bluetooth devices (identified by their MAC addresses) and btacc includes all the operations that can be performed on the type. This policy allows the apps in the domain trusted_app to read from and write to the MAC addresses in the type bt_dev. Later we describe how to associate such a domain with authorized apps, and the type with external resources.

Referring again to FIG. 1, DAC Policy Management Service 106 uses the user's input to construct in the background the DAC policies. The DAC policies used in system 100 are specified in the same way as the MAC policies, using the same format, which enables them to be processed by the policy engine and AVC also serving MAC policies. The DAC policy base 110 includes a set of types defined for the Audio channel. Audio has not been included in the MAC policies since the device attached to it cannot be uniquely identified: all we know is whether the device is an input (headset) or output (speaker) device or one with both capabilities. Even in this type of channels where there is a lack of identifiers for the external resources, SEACAT's hybrid approach allows protection through its DAC component. Specifically, for user-defined DAC policies, a mechanism is provided to lock the whole channel when necessary, a process described hereinafter for audio. Moreover, although the DAC base is supposed to be updated at runtime, to avoid the overheads that come with such updates, a set of "template" policies were predefined that connect a set of domains to a set of types in different categories (Bluetooth, NFC, SMS, Internet and Audio) with read and write permissions. The domains and types of those policies are dynamically attached to the apps and resources specified by the user during runtime. In this way, SEACAT only needs to maintain a mapping table from resources to their security contexts (user_seres_contexts) before the template rules run out.

APP LABELING. For the domains defined for MAC, how they are assigned to apps is also specified in the policies. The implementation allows the administrator to grant trusted apps, permissions to use restrictive external resources. Such apps are identified from the parties who sign them. Specifically, when an app is being installed, SEAndroid assigns it an seinfo tag according to its signature. The mapping between this tag and the app's domain is maintained in the file seapp_contexts, which Zygote, the Android core process that spawns other processes, reads when determining the app's security context during its runtime. Labeling apps for DAC is handled by the policy management service 106, which includes a set of hooks within the PackageManager and installed. Before an app is installed, these hooks present to the user a "dialogue box". This allows the user to indicate whether the app should be given a domain associated with certain channels (Bluetooth, NFC, SMS, Internet and Audio), so that it can later be given the privilege to access protected external resources. The user never deals with policies directly. Instead, in one embodiment, the user only answers simple questions such as "does this app come with an accessory?" For example, if the user answers positively to the previous question, the policy management service 106 will assign a domain to the app. For an app assigned a domain, the PackageManager labels it with an seinfo tag different from the default one (for untrusted, unprivileged apps) and stores the tag alongside its related domain within a dynamic mapping file user_seapp_contexts. Note that this action will only be taken, in the absence of a MAC rule already dictating the domain assignment for this app.

We further modified libselinux, which is used by Zygote, to assign the appropriate security context to the process forked for an app. Our instrumentation within libselinux enables loading user_seapp_contexts for retrieving the security context associated with a user-defined policy. Note that again, when an seinfo tag is found within both seapp_contexts and user_seapp_contexts, its context is always determined by the former, as the MAC policies always take precedence. In fact the system will never create a DAC policy for an external resource that conflicts with a MAC policy. Nevertheless, if a compromised system app manages to inject erroneous DAC policies, they will not affect or overwrite MAC policies. In various embodiments, the design of SEACAT system 100 also allows an app developer to declare within an app's manifest the external resource the app needs exclusive access to. With the user's consent, the app will get a domain and the resource will be assigned a type to protect their interactions through a DAC rule. This approach makes declaration of DAC policies convenient: for example, the official app of Chase can state that only itself and Android system apps are allowed to receive the text messages from Chase; a screenshot app using an ADB service can make the IP address of the local socket together with the port number of the service off limit to other third-party apps.

EXTERNAL RESOURCE LABELING. For standard local resources, such as files, SEAndroid includes policies that guide the OS to find them and label them properly. For example, the administrator can associate a directory path name with a type, so that every file stored under the directory is assigned that type. The security context of each file (which includes its type) is always kept within its extension, making it convenient to retrieve the context during policy enforcement. When it comes to external resources, however, a new way is needed to label their identifiers and store their tags. This is done using a new MAC policy file seres_contexts, which links each resource (the MAC address for Bluetooth, the serial number for NFC, the Sender ID for SMS and the IP/port pair of a service) to its security context. The content of the file is pre-specified by the system administrator and is maintained as read-only throughout the system's runtime. It is loaded into memory buffers within the framework layer and the Linux kernel respectively, and utilized by the security hooks there for policy compliance checks as explained herein.

Labeling external resources for the DAC policies is much more complicated, as new resources come and go, and the user should be able to dynamically enable protection on them during the system's runtime. SEACAT provides three mechanisms for this purpose: 1) connection-time labeling, 2) app declaration, and 3) manual setting. Specifically, connection-time labeling happens the first time an external resource is discovered by the OS, for example, when a new Bluetooth device is paired with the phone. Also, as discussed before, an app can define the external resource that should not be exposed to the public (e.g., only system apps and the official Facebook app can get messages from the Sender ID "FACEBOOK"). Finally, the user is always able to manually enter new DAC policies or edit existing ones through an interface provided by the system. Note that, the user never actually deals with SELinux-like policies. Those are automatically constructed when the user answers simple questions such as "Please select the app you downloaded for this accessory," or when the user maps the ID "FACEBOOK" to the Facebook app.

For different channels, some labeling mechanisms may work more effectively than others. Bluetooth and NFC resources are marked mainly when they are connected to the phone: whenever there are apps assigned domains but not associated with any Bluetooth or NFC resources, system 100 notifies the user once a new Bluetooth device is paired with the phone or an NFC device is detected; if such a new device has not been protected by the MAC policies, the user is asked to select, through an interface, all apps (those assigned domains) that should be allowed to access it (while other third-party apps' access requests should be denied). After this is done, a DAC rule is in place to mediate the use of the device. Note that once all such apps have been linked to external resources, SEACAT will no longer interrupt the user for device labeling, though the user can still use the policy manager 116 to manually add or modify security rules. The present disclosure provides a system configured to modify a few system apps and services to accommodate this mechanism.

For Bluetooth, we changed Settings, the Bluetooth system app and service. When the Settings app helps the user connect to a newly discovered Bluetooth device, it checks the device's MAC address against a list of mandatory rules. If the address is not on the list, the Bluetooth service pops an interface to let the user choose from the existing apps assigned domains but not paired with any resources. This is done through extending the RemoteDevices class. The MAC address labeled is kept in the file user_seres_contexts, together with its security context. This file is uploaded into memory buffers (for both the kernel and the framework layer) for compliance checks. For NFC, whenever a new device is found, Android sends an Intent to the app that registers with the channel III-B. In the present implementation, we instrumented the NFC Intent dispatcher to let the user label the device and specify the apps allowed to use it when the dispatcher is working on such an Intent. This is particularly useful when the NFC device is security critical, as now the control is taken away from the potentially untrusted apps and delegated to the user (if no MAC mechanism is in place) during runtime. Furthermore, by providing this mechanism, the system can protect itself, and it is deprived of any dependency on end-to-end authentication between apps and external devices. Lastly, by utilizing the association of apps with resources specified in MAC and DAC policies, the user can read already labeled tags directly, avoiding unnecessary interaction with the "Activity Chooser" mechanism every single time an NFC device is discovered, which improves the usability of the reading-an-NFC-device task. Again, the result of the DAC labeling is kept in user_seres_contexts.

External resources associated with SMS and Internet are more convenient to label through app declaration and manual setting. As discussed before, an app can request exclusive access to the text messages from a certain SMS ID. The user can also identify within the interface of our policy manager 116 a set of SMS IDs (32665 for "FACEBOOK", 24273 for "Chase", etc.) to make sure that only com.android.sms can get their messages (Note that the SMS IDs for services are public. It is easy to provide a list of well-known financial, social-networking services to let the user choose from). Also, there are cases where manual setting is needed for Internet. For example, an organization can require its employees to set policies on their phones to ensure that internal IPs are only accessed by its enterprise apps. Other Internet resources should be specified by the app. For example, those using ADB-level services can state the local IP address and services' port numbers to let our system label them. With regard to Audio, we label the whole channel at the right moment. Specifically, the DAC rule for the channel is expected to come with the app requiring it or set manually by the user through the policy manager 116. Whenever system 100 observes that the Audio jack is connected to a device that fits the profile (input, output or mixed), SEACAT causes a "dialogue box" to be displayed on the Android device wherein the dialog box asks the user whether the device needs protection, if a DAC rule has already been required by either an app or the user. This window popup may be avoided when the app (the one expected to have exclusive access to the Audio channel) is found to run in the foreground. In either case, the whole Audio channel is labeled with a type, which can only be utilized by that app, system apps and services. This information is again stored in user_seres_contexts for policy enforcement. Notably, as soon as the device is detached from the Audio jack, the type is dropped from the file, which releases the entire channel for other third-party apps. To completely remove the pop-ups, the user can set the system to an "auto" mode in which the Audio is only labelled (automatically) when the authorized app is running. In this case, the user needs to follow a procedure to first start the app and then plug in the device to avoid any information leak.

POLICY COMPLIANCE CHECK AND ENFORCEMENT: COMPLIANCE CHECK. Referring to the illustrative embodiment of FIG. 2 a conceptual block diagram of a policy compliance check system according to the principles of the present disclosure is provided. Compliance check system 200 (hereafter "system 200") includes security hook 202, access resource request 204, AVC 206, and look-up table 208. In one embodiment, to perform a compliance check, security hook 202 needs to obtain the security contexts of the subject (the app), the object (MAC address, NFC serial number, etc.) and the operation to be performed (e.g., read, write, etc.) to construct a query for the policy engine (see FIG. 2). Here the subject's context can be easily found out: on the framework layer, this is done through the SEAndroid function getPidContext, which utilizes the PID of a process to return its context information. Although the same approach also works within the Linux kernel, a shortcut is used in controlling Internet connections through sockets. Specifically, within the socket's structure, SEAndroid already adds a field sk_security to keep the security context of the process creating the socket. The field is used by the existing hooks to mediate the access to IP/port types. The present embodiment puts the enforcement of DAC policies there, which involves finding the security contexts of an IP-port pair from a DAC table within the kernel.

The object's context is kept within the MAC policy file seres_contexts and the DAC file user_seres_contexts. To avoid frequently reading from those files during the system's runtime, SEACAT uploads their content to a pair of buffers in the memory both in the framework layer and the kernel. These buffers are organized as hash maps, serving as the mapping tables to help security hook 202 retrieve objects' security contexts. Specifically, the present disclosure implements a function for searching the mapping tables within libselinux, and exposed this interface to the framework so that security hook 202 can access it through Java or native code. Within the kernel, the present disclosure includes another mapping table for the DAC policy (Note that there is no table built for MAC here, since SELinux already has a table for enforcing MAC policies on IPs. Also, all other channels are enforced on the framework layer). This table is synchronized automatically with the one for the framework layer to make sure that the same set of DAC policies are enforced on both layers. The set of operations created for manipulation and retrieval of information from the memory buffers and exposed through libselinux to the rest of the system, are listed within Table III.

TABLE III

A list of operations SEACAT offers to system apps and services.

| FUNCTION | DESCRIPTION |
| --- | --- |
| loadPDPolicy | Loads the MAC (seres_res_contexts) and DAC (user_seres_contexts) policy bases containing the resource with security context associations, into the SEACAT memory buffers. |
| getResourceSecContext | Performs a lookup in the SEACAT memory buffers for a security type assigned to a resource. |
| getResourceChannel | Performs a lookup in the SEACAT memory buffers for the channel that a resource belongs to. |
| isResourceMAC | Returns 1 if the resource is present in SEACAT memory buffers and was loaded from the MAC policy base, 0 if it was loaded from the DAC policy base, or NULL otherwise. |
| insertDACRes | Stores the security context of a resource in the appropriate memory buffer and the corresponding policy base. |
| getDomain | Returns the security context assigned to a third-party app. |

Figure 2:
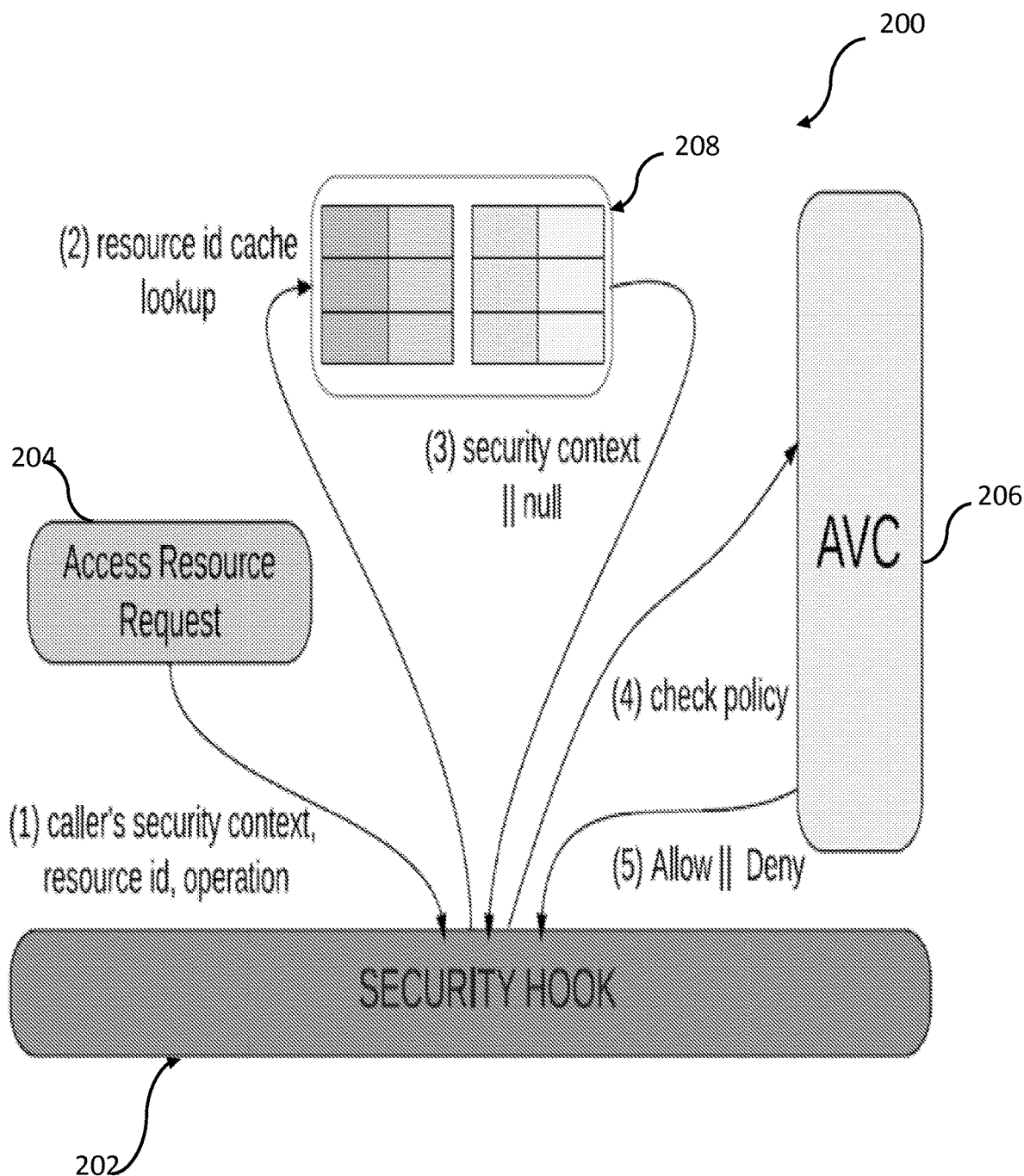
FIG. 2 is a conceptual diagram of a policy compliance check according to the principles of the present disclosure.

Given the security contexts for a subject (the app) and an object (e.g., an SMS ID), security hook 202 may be configured to query the AVC and policy engine to find out whether an operation (i.e., system call) is allowed to proceed. On the framework layer, this policy compliance check can be done through selinux_check_access. In one embodiment, this function is wrapped adding program logic for retrieving an object's security context from the mapping table. As shown in FIG. 2, the new function seacat_check_access or access resource request 204 takes as its input a resource's identifier (Bluetooth MAC, SMS ID, etc.), the caller's security context and the action to be performed, and further identifies the resource's security context before running the AVC and the policy engine on those parameters. Note that for the resource appearing within both MAC and DAC tables, its security context is only determined by the MAC policy. Also, the resource not within either table is considered to be public and can be accessed by any app. Again, this new function is made available to both Java and native code. The same mechanism was also implemented within the kernel, through wrapping the compliance check function avc_has_perm. The AVC and the policy engine are largely intact here; as the system was carefully designed to make sure that the DAC rules are in the same format as their MAC counterparts and therefore can be directly processed by SEAndroid.

SECURITY HOOKS: BLUETOOTH. Referring now to the illustrative embodiment of FIG. 3, a conceptual diagram representing incorporation of the present policy enforcement method into an Android Bluetooth architecture is provided. Policy enforcement method 300 includes application framework block 302, Dabinder block 304, Bluetooth service block 306, Hardware Abstraction Layer block 308 (hereinafter "HAL block 308"), and Bluetooth stack 310. In one embodiment, to fully control the Bluetooth channel, all the functions of method 300 need to be instrumented. A prominent example is Bluetooth Socket.connect within the Bluetooth service, which needs to be invoked for establishing a connection with an external device. In one embodiment, the present disclosure includes inserting a security hook at the beginning of the function to mediate when it can be properly executed. A problem is how to get the process ID (PID) of the caller process for retrieving its security context through getPidContext. The system cannot use the PID of the party that directly invokes the function, which is actually the Bluetooth service. Instead, the system turns to DABinder block 304, which proxies the inter-process call (IPC) from the real caller app. Specifically, the present hook calls getCallingPid (provided by Binder) to find out the app's PID and then its security context, and passes the information to the Bluetooth stack at block 310. Inside the Bluetooth stack the present disclosure includes instrumenting the actual connection attempt, which uses the app's security context, the Bluetooth MAC address to be connected and the "open" operation as inputs to query seacat_check_access. What is returned by the function causes the connection attempt to either proceed or immediately stop. The Bluetooth service is notified accordingly regarding the success or failure of the connection attempt. In the same manner, we can instrument other functions in the Bluetooth stack.

Figure 3:
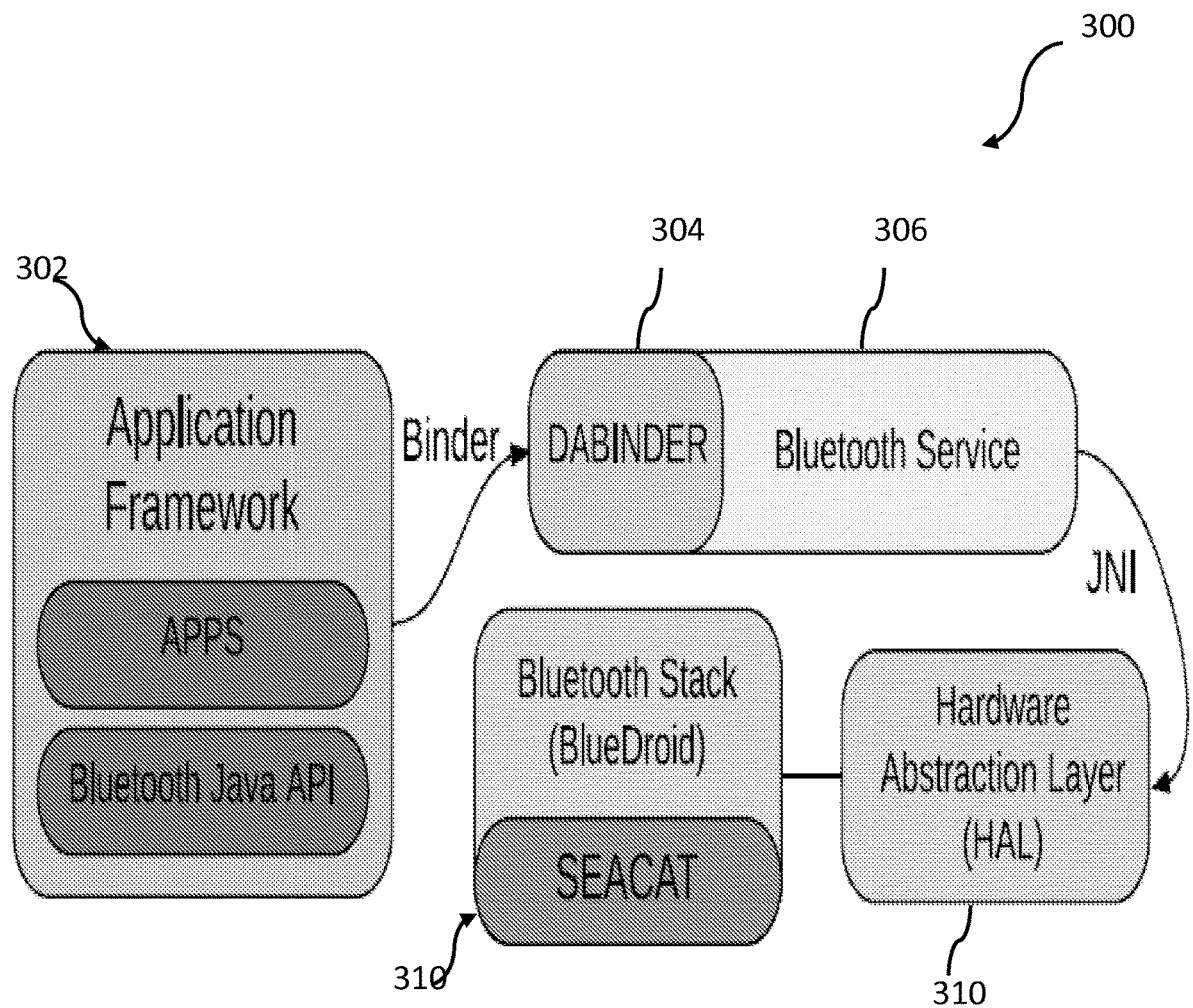
FIG. 3 is a conceptual diagram representing incorporation of the present policy enforcement method into an Android Bluetooth architecture.

The embodiment of FIG. 3 illustrates how the policy enforcement is incorporated into the Android Bluetooth architecture. The hooks are placed within the Bluetooth stack, which cannot be circumvented by a malicious app without the system privilege. This is in contrast to Dabinder, a framework-layer protection mechanism proposed in prior work. Dabinder works within the Bluetooth service and can be bypassed by native code that directly talks to the Bluetooth stack (also illustrated in FIG. 3), when it has the Bluetooth permissions. Further, protection is integrated into SEAndroid and can be used to enforce MAC policies, which Dabinder cannot.

NEAR FIELD COMMUNICATION ("NFC"). For the broadcom chip on Google Nexus 4 devices, the NFC stack has been implemented on the framework/library layer through libnfc-nci. As a result, all of the security hooks of the present embodiment are placed on this layer, within major NFC functions readNdef, writeNdef and connect, for mediating a caller process's operations on an NFC device with a particular serial number (which is treated as the device's identifier). When a new NFC device is found to be in proximity, NFC runs a dispatcher to identify which apps have registered for that device through Intent-filters. When the tag/device contains NDEF data, and there exists at least one app with the NDEF_DISCOVERED priority, the dispatcher will deliver an Intent encapsulating this data to the identified app. This target app can access the data directly through the Intent. In cases where multiple apps request access to that NFC device, an "Activity Chooser" box will be presented to the user so they can choose which activity should be launched. This operation impedes user experience as it happens every time the tag/device is discovered. Further there is no guarantee that the "Activity Chooser" will be presented to the user as described herein. The present disclosure instrumented the NFC dispatcher mechanism to execute the MAC and DAC policy compliance check against all apps requesting the Intent (whether that is one app or more), with regards to a specific device serial number. For those that fail the check, the dispatcher simply ignores them and therefore the Intent with the NFC device's contents will never reach them. The present approach not only provides stronger security guarantees than the current system, as it controls all cases, but in contrast to many security solutions, it also ameliorates users' experience. Once a rule is in place for an app-device interaction, then the "Activity Chooser" will not be presented again to the user every time the device is discovered.

INTERNET. The Internet channel has been controlled inside the kernel, with security hooks placed within the functions for different socket operations. As discussed before, SEAndroid has already hooked those functions for enforcing mandatory policies on IP addresses, port numbers and others. The present embodiment extended those existing hooks to add enforcement mechanisms for DAC policies. Specifically, we changed selinux_inet_sys_rcv_skb and selinux_sock_rcv_skb_compat to enable those wrapper functions to search the DAC mapping table within the kernel for the security contexts of IP-port pairs specified by the user and use such information to call avc_has_perm. Note that this enforcement happens to the objects (IP and port numbers) that have already passed the MAC compliance check: that is, those IP and port numbers are considered to be public by the administrator, while the user can still add her additional constraints on which party should be allowed to access them.

Figure 4:
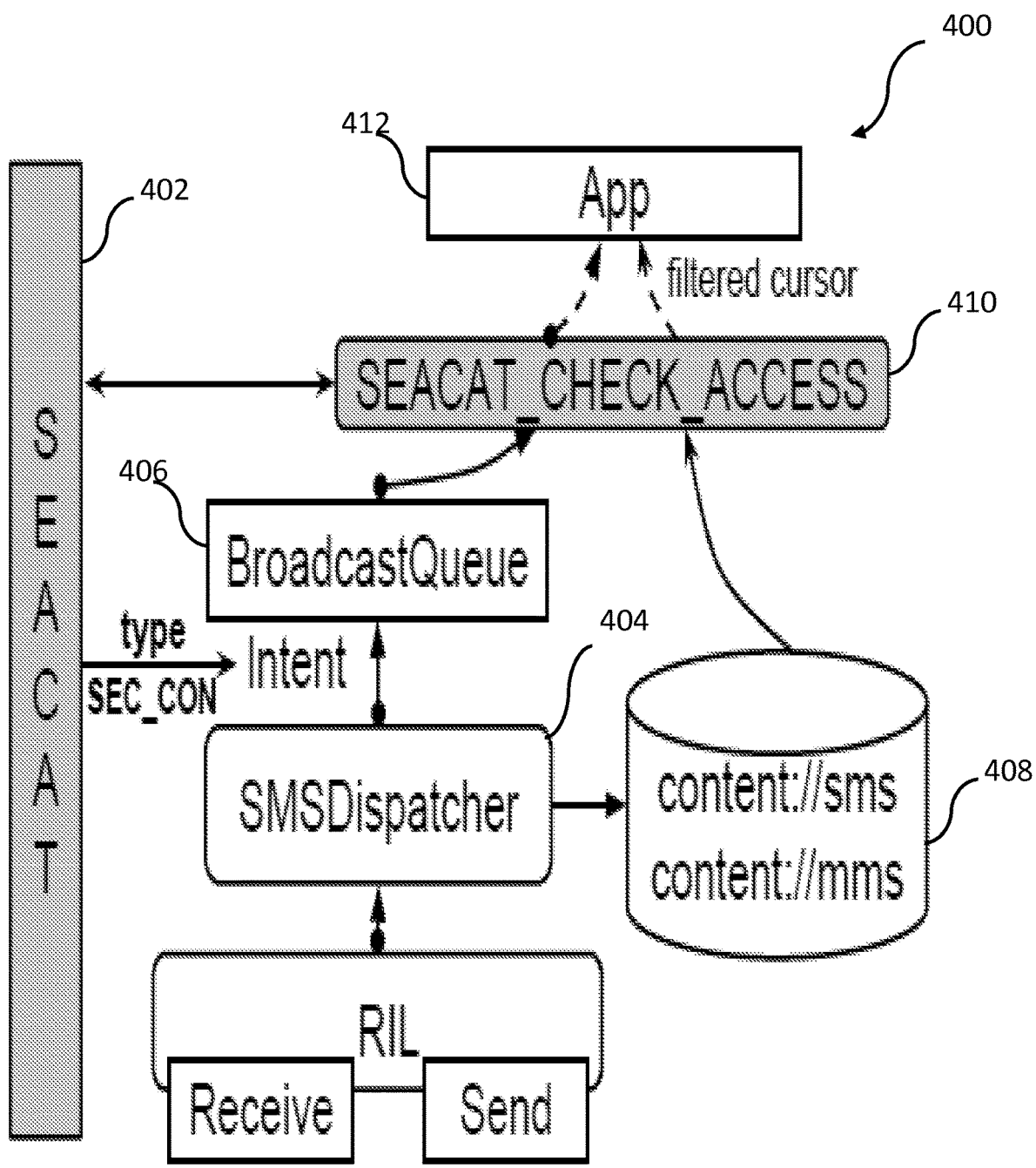
FIG. 4 is a conceptual diagram of SMS enforcement according to the principles of the present disclosure.

SMS. Referring to the illustrative embodiment of FIG. 4, a conceptual diagram of SMS enforcement according to the principles of the present disclosure is provided. SMS enforcement workflow 400 includes a SEACAT block 402, a SMSDispatcher block 404, a BroadcastQueue block 406, a content block 408, a check access block 410, and an application block 412. To mediate the complicated SMS channel, the present disclosure instruments both SMS and MMS to track the entire work flow 400 and enforce MAC and DAC policies right before a message is being handed over to apps (See block 412 of FIG. 4). Specifically, the present disclosure hooks the function processMessagePart within SMSDispatcher 404 as described herein to get the ID of the message sender (i.e., the originating address) through SMSMessageBase.get-OriginatingAddress( ). This sender ID serves as an input for searching the mapping tables. The security context identified this way is then attached to the Intent delivered to MMS as an extra attribute SEC_CON. On the MMS front, a security hook inspects the attribute and further propagates the security context to another attribute within a new Intent used to transmit the real message once it is downloaded. We also modified the function deliver-ToRegisteredReceiver-Locked within BroadcastQueue to obtain the security context of each app recipient involved in the broadcast and runs seacat_check_access to check whether the app should be allowed to get the message before adding the message to its process message queue.

Besides getting SMS message from Intent receiver for SMS_RECEIVED_ACTION or SMS_DELIVER_ACTION, an app can also directly read from the SMS or MMS content provider given the SMS_READ permission (Note that on Android 4.4, only the default sms app gets this Intent). To mediate such accesses, we further instrumented the content provider of SMSProvider and MMSProvider to perform the policy compliance check whenever an app attempts to read from its database: based on the app's security context and each message's address, our hooks sanitize the cursor returned to the app, removing the message it is not allowed to read.

AUDIO. Like SMS, the Audio channel is also mediated on the framework layer. Whenever a device is connected to the Audio jack, WiredAccessoryManger detects the device and calls setDeviceStateLocked. Within the function, the present disclosure includes placing a hook that identifies the type of the device (input/output/mixed) and checks the presence of a policy that controls the access to such a device. If so, it directly calls the SEACAT function SensChannel.assignType to assign the object type in the policy to the Audio channel (which prevents the channel from being used by unauthorized third-party apps) when an authorized app is running in the foreground. Otherwise, it pops up a "dialogue box" to let the user decide whether the device is the object within the policy and therefore needs to be protected. In either case, as soon as the device is unplugged from the Audio jack, the hook immediately removes from the DAC mapping table the entry for the Audio channel, thereby releasing it to other third-party apps. Policy enforcement happens within the functions for collecting data from the Audio channel. Particularly, SEACAT has a hook inside the startRecording method of android.media.AudioRecord. Once the method is invoked, it looks for the security contexts for the calling process (through getContext) and the Audio channel (using getResourceSecContext) to check polices and determine whether the call can go through.

EVALUATION. In the present disclosure, the effectiveness of SEACAT or system 100 was evaluated against all existing threats to Android external resources and the overheads it introduces were measured. In one embodiment, the concepts of the present disclosure were applied to a pair of Nexus 4 phones with Android 4.4 (android-4.4.2 r12), kernel KRT16S, with the 3.4 kernel (androidmsmmako3.4kitkatmr0): one installed with an unmodified OS (AOSP) to serve as a baseline, and the other with the SEACATenhanced kernel and framework.

EFFECTIVENESS. KNOWN THREATS. Table IV presents five known threats to external resources noted in the present disclosure, which include collection of data from iThermometer through Bluetooth misbonding, unauthorized use of an ADB proxy based screenshot service through local socket connections, as well as attacks on SMS (stealing text messages from Chase and Facebook), Audio (gathering activity data from the UP wristband) and NFC (reading sensitive information from NFC tags). The present disclosure includes running those attacks on the unprotected Nexus 4, which turned out to be all successful: the malicious app acquired sensitive information from the external resources through the channels (Bluetooth, SMS, Internet, Audio and NFC), exactly as reported in prior research and described herein.

TABLE IV

Threats to Android external resources.

| No | KNOWN THREATS |
|---|---|
| 1 | Bluetooth misbonding attack |
| 2 | unauthorized adb-based screenshots |
| 3* | unauthorized read of an SMS message |
| 4* | unauthorized access to audio device |
| 5* | unauthorized read of an NFC device's contents |

*attacks demonstrated here.

PREVENTING UNAUTHORIZED RESOURCE ACCESS. All such attacks, however, stopped working on the SEACAT-enhanced Nexus 4. Specifically, after assigning a type to the MAC address of the iThermometer device through the present policy management service, it was found that only the official app of iThermometer, which was assigned to an authorized domain, was able to get data from the device. The malicious app running in the untrusted_app domain could no longer obtain body temperature readings from the thermometer. For SMS, once we labeled the Sender IDs of Chase and Facebook with a type that can only be accessed by the apps within the system domain, the third-party app could not find out when messages from those services came, nor was it able to read them from the SMS content provider content://sms. On the other hand, the user could still see the messages from com.android.sms. Similarly, the screenshot attack reported in prior research was completely thwarted when the local IP address and port number was labeled. Also the security type given to the serial number of an NFC tag successfully prevented the malicious app from reading its content. In the presence of both authorized and unauthorized apps, the protected Nexus directly ran the authorized app, without even asking the user to make a choice, as the unprotected one did. For Audio, after the user identified the presence of the Jawbone wristband or the official app of the device was triggered, the channel could not be accessed by the malicious app. It was released only after the wristband was unplugged from the Audio jack.

The effectiveness of protection was evaluated under both MAC and DAC policies for all those attack cases, except the one on the Audio channel, for which we only implemented the DAC protection as described herein. Also, assigning a resource specified by a MAC policy to a DAC type using our policy manager and indicates that the attempt could not go through. Even after manually injecting such a policy into the DAC database and mapping table (which cannot happen in practice without compromising the policy manager), all the security hooks ignored the conflicting policy and protected the resources in accordance with the MAC rules.

PERFORMANCE. EXPERIMENTAL SETTING. To evaluate the performance impact of SEACAT, the present disclosure measures the execution time for the operations that involve the instrumentations, and compared it with the delay observed from the baseline (i.e., the unprotected Nexus 4). Table V shows examples of the operations used. In the experiments, 10 trials were conducted for each operation to compute its average duration. Note that comparison with SEAndroid is moot, as the hooks we placed to enforce control over external resources are not present there. Thus the operations measured will provide the same result whether on AOSP 4.4 or SEAndroid.

Specifically, the installation time was recorded for a new app, which involves assignment of domains. The time interval measured in the experiment is that between the moment the PackageManager identifies the user's "install" click and when the BackupManagerService gets the Intent for the completion of installing an app with 3.06 MB. For Bluetooth, both the pairing and connection operations were timed. Among them, the pairing operation recorded starts from the moment it was triggered manually and ends when the OnBondStateChanged callback was invoked by the OS. For connection, the present disclosure looked at the execution time of BluetoothSocket.connect. Regarding SMS, the present disclosure measures the time from when a SMS message is received (processMessagePart) to when the message is delivered to all the interested receivers and the process of querying the SMS content provider. The Internet-related overhead was simply found out from the network connection time. The amount of time it takes to dispatch an NFC message is related to the status of the target app: when it was in the foreground, the present disclosure measures the interval between dispatchTag and the completion of the NfcRootActivity; otherwise, our timer was stopped when setForegroundDispatch was called. For the Audio channel, the present disclosure records the time for the call AudioRecord.startRecording to go through.

RESULTS. The results of this evaluation are presented in Table V. As we can see from the table, the delays introduced by SEACAT are mostly negligible. Specifically, the overhead in the installation process caused by assigning domains to an app was found to be as low as 49.52 ms. Policy enforcement within different security hooks (with policy checks) happened almost instantly, with a delay sometimes even indistinguishable from the baseline. In particular, in the case of NFC, even when the unauthorized app with the NFC permission was running in the foreground, the present implementation almost instantly found out its security context and denied its access request. The only operation that brings in a relatively high overhead is labeling an external device. It involves assigning a type to the resource, saving the label to user_seres_contexts, updating the DAC mapping table accordingly and even changing the DAC policy base to enable authorized apps' access to the resource when necessary. On average, those operations took 189.44 ms. Note that this is just a one-time cost, as long as the user does not change the type given to a resource. An exception is Audio, whose type is assigned whenever the dongle under protection is attached to the Audio jack. Note that the user only experiences this sub-second delay once per use of the accessory, which is believed to be completely tolerable. In results the present disclosure reports the absolute time needed to perform an operation, instead of providing the percentage difference with the baseline. Consider for example the operation content://sms query( ). On the baseline it takes 2.7 ms while the same operation costs 6.39 ms on SEACAT. While this entails a 137% slowdown, it is way below a user perceivable delay.

All the results presented here do not include the delay caused by human interventions: for example, the time the user takes to determine if an app or resource should be protected. Such a delay depends on human reaction and therefore is hard to measure. Also they only bring in a one-time cost, as subjects (apps) and objects (resources) only need to be labeled once. Actually, for NFC, the implementation could even remove the need for human intervention during policy enforcement: in the presence of two apps with the same NFC priority, the user could be asked to choose one of them to handle an NFC event whenever it happens, while under SEACAT, this interaction is avoided if one of the apps is assigned in the domain authorized to access the related NFC device and the other is not.

RELATED WORK: SEANDROID. Our approach is built on AOSP, on top of the partially integrated SEAndroid. SEACAT leverages the existing AVC and policy engine for compliance checks over both MAC and DAC databases. By comparison, the current implementation of SEAndroid does not offer any protection for external resources: it neither can specify policies for this purpose, nor does it have the right hooks to enforce such policies. Particularly on the framework layer, the MMAC mechanism within SEAndroid can only achieve the control granularity at the permission level, a far cry from what is expected to mediate external resources.

An improvement on MMAC has been proposed recently, which, like SEACAT, also supports app-based policies and user-specified policies. Further, the way it controls content providers is similar to what the present disclosure includes when sanitizing the list of messages to let an app access only those it is allowed to read. Nevertheless, like SEAndroid, this prior work does not offer any means to control external resources either. It cannot label those devices, not to mention enforcing any policies. Also, the approach is designed as an alternative to SEAndroid, which comes with its own policy language and policy engine. By comparison, SEACAT is carefully designed to be a natural extension of AOSP to handle external resources.

EXTERNAL-DEVICE MISBONDING. The present disclosure is partially inspired by prior research on Bluetooth misbonding problems and unauthorized screenshot taking. Particularly, a security mechanism, called Dabinder, was developed as a result of the prior work to offer a fine-grained control on Bluetooth devices. Dabinder is implemented on the framework layer, inside the Bluetooth service which could be bypassed by any app with native code. Native code can be used to talk directly to the Bluetooth stack and in general circumvent the framework protection. SEACAT works as an integrated part of SEAndroid in AOSP, which offers cross-layer protection, preventing unauthorized access to Linux devices. Specifically for Bluetooth, SEACAT enforces policies directly in the Bluetooth stack (see FIG. 3), providing much stronger security guarantees. Also, Dabinder is designed to be a DAC mechanism just for protecting Bluetooth devices, while SEACAT offers centralized protection that enforces both MAC and DAC policies, across multiple channels (Bluetooth, SMS, Internet, Audio and NFC) and its unified approach allows easy extension to new channels.

Most related to present disclosure is Porscha, which controls the content an app can access on a phone for digital rights management. For SMS messages, this has been done through sending an IBE encrypted message to a Porscha proxy on the phone, which further dispatches the message to authorized apps according to a set of policies. Porscha needs to make a substantial change to the SMS mechanism, adding the proxy to intercept incoming messages and a new field in MMS content provider for tagging messages. By comparison, SEACAT just places hooks within the existing mechanism, using SEAndroid for policy compliance check, and therefore is much easier to integrate into today's Android, and also offers both mandatory and discretionary protection across-layers.

SEACAT is presented herein, a new security system that enhances today's Android security model to protect external resources. SEACAT was designed to provide integrated security control through both MAC and DAC across different Android layers. More specifically, we utilize the same policy engine and AVC to support policy compliance checks on both MAC and DAC policy sets, which were extended for setting policies on external resources. Such checks are performed on the Android framework layer as well as the Linux kernel, within different security hooks placed there to control various channels (Bluetooth, SMS, Internet, Audio and NFC). DAC and MAC rules are enforced through the same security hooks. In the meantime, a misconfigured DAC policy will not cause the MAC rules to be circumvented. This system provides phone manufacturers and system administrators means to define mandatory security policies. It also empowers ordinary Android users to specify their own rules to protect resources from third parties. SEACAT provides strong security guarantees, incurs a negligible performance overhead, is backwards-compatible and in

TABLE V

Performance Measurements in milliseconds (ms). Confidence Interval (CI) given for confidence level = 95%

| | AOSP | | | SEACAT | | | | |
|---|---|---|---|---|---|---|---|---|
| Operation | mean | stdev | CI | Operation | mean | stdev | CI | overhead (ms) |
| install app | 1415.6 | 40.61 | ±25.17 | install app (label) | 1465.2 | 76.07 | ±47.15 | 49.52 |
| Bluetooth pairing | 1136.5 | 351.65 | ±217.95 | Bluetooth pairing (label) | 1434.4 | 237.60 | ±147.20 | 279.9 |
| BluetoothSocket.connect | 1699.1 | 770.22 | ±477.38 | BluetoothSocket.connect | 1616 | 306.83 | ±190.17 | −83.1 |
| | | | | BluetoothSocket.connect (block) | 6 | 3 | ±1.86 | −1693.1 |
| dispatchTag | 87.3 | 4.32 | ±2.68 | dispatchTag(MAC:allow) | 96.9 | 4.63 | ±2.87 | 9.6 |
| | | | | dispatchTag(MAC:block) | 113.1 | 3.57 | ±2.21 | 25.8 |
| | | | | dispatchTag(label + allow) | 358.28 | 40.47 | ±25.08 | 270.98 |
| dispatchTag (foreground) | 272 | 26.33 | ±16.32 | dispatchTag(allow foreground) | 269 | 41.53 | ±25.74 | −3 |
| | | | | dispatchTag(deny foreground) | 132.5 | 21.76 | ±13.49 | −139.5 |
| Ndef.writeNdefMessage(app A) | 197.1 | 6.17 | ±3.82 | Ndef. writeNdefMessage (DAC/MAC allow) | 190.89 | 14.61 | ±9.06 | −6.21 |
| Ndef.writeNdefMessage(app B) | 112.4 | 12.45 | ±7.72 | Ndef. writeNdefMessage: (unlabeled) | 117.5 | 16.36 | ±10.14 | 5.1 |
| SMS process message | 94 | 7.3 | ±4.52 | SMS process message(allow) | 106.5 | 8.11 | ±5.03 | 12.5 |
| | | | | SMS process message (redirect) | 154 | 12.11 | ±7.51 | 60 |
| content://sms query( ) filter (10 messages) | 2.7 | 1.1 | ±0.68 | SMS query( ) filter | 6.39 | 2.4 | ±1.49 | 3.69 |
| Audio device connection | 14.9 | 5.11 | ±3.17 | Audio device connection (label + connect) | 177.6 | 21.92 | ±13.59 | 162.7 |
| AudioRecord.startRecording (allow) | 85.9 | 6.84 | ±4.24 | AudioRecord.startRecording (allow) | 95.6 | 16.75 | ±10.38 | 9.7 |
| | | | | AudioRecord.startRecording (block) | 7.2 | 3.58 | ±2.22 | −78.7 |

ENHANCING ANDROID SECURITY MODEL. Android permission system has long been scrutinized and there is a line of research on enhancing this security model. some cases it even improves users' experience. While the embodiments described herein only manages the 5 most popular channels, it should be understood that the principles of this disclosure may be extended to other channels, such as Wireless and Infrared. Additionally, while the present embodiments of SEACAT cannot provide MAC protection to Audio, due to the lack of identifiers for the devices attached to this channel, it should be understood that one skilled in the art could fingerprint different Audio devices through probing them to inspect their responses.

SEACAT provides a strong binding between mobile applications and external devices. For example, a glucose meter can only communicate with the official app on a mobile phone. SEACAT combined Linux discretionary access control and mandatory access control. It provides a flexible and strong access control. A system administrator could specify mandatory access control rules making sure critical devices only communicate with trusted application. The user can also easily define their own rules to prevent unauthorized apps from communicating with malicious apps. The system also makes sure mandatory access control has higher priority than user defined rules. Finally, it should be understood that while the present disclosure focuses on Android operating systems, one of skill in the art may also apply the principles of the present disclosure to iOS mobile/tablet devices as well.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. While this disclosure may have been described as having an exemplary design, the present disclosure may be further modified within the scope of this disclosure. This application is therefore intended to cover any variations, uses, or adaptations of the disclosure using its general principles. Further, this application is intended to cover such departures from the present disclosure as come within the known or customary practice in the art to which this disclosure pertains.

We claim:

1. A security enhanced channel control system useable on a wireless device comprising:
   a memory; and
   at least one processor configured to apply a compliance check to a first system layer and a second system layer;
   wherein the memory stores a first policy base associated with a mandatory access control (MAC) base, the first policy base defining one or more application-based security policies corresponding to channel access permissions for a plurality of channels associated with the first and second system layers;
   wherein the at least one processor implements the first policy base to determine one or more access control rules that are applied to at least one of the plurality of channels, the at least one of the plurality of channels being established between an authorized application and an external resource associated with the authorized application, the one or more access control rules being used to preclude an unauthorized application from accessing the at least one of the plurality of channels established between the authorized application and the external resource.

2. The system of claim 1, wherein the memory stores a second policy base associated with a discretionary access control (DAC) base, the second policy base being adaptable to include one or more user-defined security policies corresponding to the channel access permissions for the plurality of channels.

3. The system of claim 2, wherein the at least one processor implements at least one of the first policy base and the second policy base to determine the one or more access control rules that are applied to the at least one of the plurality of channels to preclude the unauthorized application from accessing the at least one of the plurality of channels.

4. The system of claim 1, wherein the at least one processor is supported by at least one vector cache, wherein the at least one processor operates the MAC base and the DAC base to perform the compliance check.

5. The system of claim 4, wherein the first system layer is a framework layer and the second system layer is a Linux kernel layer, and wherein the plurality of channels include at least one of a message channel, a Bluetooth channel, an audio channel, an internet channel, a near-field communication channel, a wireless channel, and an infrared channel.

6. The system of claim 5, wherein one or more security types represent a resource based upon a resource identity observed from the plurality of channels, wherein the resource identity includes a media access control address of a Bluetooth accessory, a serial number of a near-field communication device, an Internet Protocol address of a socket, and a message identification of a short message service sender.

7. The system of claim 6, wherein the memory stores one or more security hooks and at least one mapping table, wherein the security hooks are operable within system functions responsible for operations on one or more channels over the first and second system layers.

8. The system of claim 7, wherein the security hooks identify a security context of an application and a resource identity from a channel by querying the at least one mapping table,. and wherein the identified security context is used by the at least one processor to determine whether the application can access the channel.

9. The system of claim 1, wherein the at least one processor detects a coupling of the external resource to the wireless device and, in response to detecting the coupling, associates the external resource to at least one of a security context and one or more applications assigned to a domain, and wherein the at least one processor instructs a user to select at least one application that is allowed to access the external resource.

10. A method for controlling access to one or more communication channels of a wireless device, comprising:
   establishing, by a processor, a first policy base containing a security context for at least one communication channel, the first policy base being associated with a mandatory access control (MAC) base;
   establishing, by the processor, a second policy base containing a security context for at least one communication channel, the second policy base being associated with a discretionary access control (DAC) base;
   defining one or more security policies for access to the one or more communication channels, the one or more security policies being associated with at least one of a first system layer and a second system layer based on the first policy base and the second policy base;
   performing a compliance check at least in response to a request from a first application to access a communication channel established between a second application and an external resource associated with the second application, the compliance check being applied to at least one of the MAC base, the DAC base, and the first and second system layers; and in response to performing the compliance check, determining, by the processor, whether the first application can be given access to the communication channel established between the second application and the external resource.

11. The method of claim 10, wherein the processor is supported by a first vector cache of the first system layer and a second vector cache of the second system layer, and the processor operates the MAC base and the DAC base to perform the compliance check.

12. The method of claim 10, further including, establishing, by a user of the wireless computing device, one or more user-defined security policies associated with the DAC base, the user-defined security policies indicating which one of the one or more communication channels that the first application is permitted to access.

13. The method of claim 10, wherein the second policy base associated with the DAC base is adaptable to include one or more user-defined security policies corresponding to channel access permissions of the one or more communication channels.

* * * * *